United States Patent [19]

Ueda et al.

[11] Patent Number: 5,771,872

[45] Date of Patent: Jun. 30, 1998

[54] COMBUSTION CHAMBER OF AN INTERNAL COMBUSTION ENGINE

[75] Inventors: Takanori Ueda; Takeshi Okumura, both of Susono, Japan

[73] Assignee: Toyota Jidosha Kabushiki Kaisha, Toyota, Japan

[21] Appl. No.: 826,819

[22] Filed: Apr. 8, 1997

[30]    Foreign Application Priority Data

Apr. 11, 1996   [JP]   Japan ..................................... 8-089581

[51] Int. Cl.[6] ...................................................... F02B 23/02
[52] U.S. Cl. ............................................................ 123/661
[58] Field of Search ........................... 123/193.5, 193.6, 123/661

[56]                 References Cited

U.S. PATENT DOCUMENTS

| 4,026,250 | 5/1977 | Funiciello | 123/289 |
|---|---|---|---|
| 4,300,498 | 11/1981 | May | 123/661 |
| 4,318,376 | 3/1982 | Nakamura et al. | 123/661 |
| 4,344,408 | 8/1982 | Inoue et al. | 123/279 |
| 4,499,872 | 2/1985 | Ward et al. | 123/90.18 |
| 4,759,323 | 7/1988 | August | 123/661 |
| 4,785,776 | 11/1988 | Tokura et al. | 123/269 |
| 4,920,937 | 5/1990 | Sasaki et al. | 123/661 |
| 5,103,784 | 4/1992 | Evans | 123/661 |
| 5,109,816 | 5/1992 | Sasaki | 123/276 |
| 5,211,145 | 5/1993 | Ichikawa et al. | 123/73 C |
| 5,307,773 | 5/1994 | Suzuki | 123/661 |
| 5,445,135 | 8/1995 | Feuling | 123/661 |

FOREIGN PATENT DOCUMENTS

| A-1-477125 | 6/1967 | France . |
|---|---|---|
| A-2-410130 | 6/1979 | France . |
| A-27-55531 | 6/1978 | Germany . |
| U-60-102428 | 7/1985 | Japan . |
| A-60-169626 | 9/1985 | Japan . |
| A-5-79370 | 3/1993 | Japan . |
| A-6-264747 | 9/1994 | Japan . |
| B2-8-30414 | 3/1996 | Japan . |

*Primary Examiner*—David A. Okonsky
*Attorney, Agent, or Firm*—Oliff & Berridge, PLC

[57]              ABSTRACT

A combustion chamber of an internal combustion engine is disclosed. The combustion chamber comprises an approximately triangular upper wall in at least one vertical section passing through the center of the combustion chamber, a squish area formed by a peripheral portion of upper wall of piston and the upper wall of the combustion chamber, and a step which is formed on at least one of the peripheral portions of the piston and the upper wall of the combustion chamber. The radial and outward flows impinge on the step inside of the squish area. A height of the step in at least the vicinity of the vertical section is approximately equal to the smallest clearance of the squish area.

8 Claims, 3 Drawing Sheets

COMBUSTION CHAMBER OF AN INTERNAL COMBUSTION ENGINE

BACKGROUND OF THE INVENTION

1. Field of the Invention

The present invention relates to a combustion chamber of an internal combustion engine.

2. Description of the Related Art

In a usual internal combustion engine, an upper wall of the combustion chamber in the cylinder head is approximately conical to facilitate the arrangement of intake and exhaust valves. A spark plug is arranged at the top portion of the upper wall. Japanese Unexamined Utility Model Publication No. 60-102428 discloses that in such a combustion chamber, a peripheral portion of the upper wall of the combustion chamber is projected downward and a peripheral portion of the upper wall of the piston is projected upward. Therefore, the two peripheral portions become close to each other at the end of a compression stroke and thus air-fuel mixture therebetween is pushed out and squish flows can be created in the combustion chamber.

The lower surface of the peripheral portion in the combustion chamber and the upper surface of the peripheral portion in the piston are approximately parallel with the conical upper wall of the combustion chamber. Therefore, the squish flows direct to the spark plug and impinge on each other, so that turbulence can be created at the vicinity of the spark plug, and thus the combustion speed at the center of the combustion chamber can become high.

Immediately after the top dead center of a compression stroke, the squish area formed by the peripheral portion of the upper wall of the combustion chamber and the peripheral portion of the upper wall of the piston sucks the air-fuel mixture. This phenomenon is called "opposite squish". In the above-mentioned combustion chamber, the peripheral portion of the upper wall of the combustion chamber projects largely so that a relatively large step is formed on the upper wall of the combustion chamber. Therefore, immediately after the top dead center of a compression stroke, the air-fuel mixture flows outwardly and radially along the upper wall of the combustion chamber to become the opposite squish and impinges on the step so that large vertical swirls of the air-fuel mixture are created. However, the clearance in the squish area at this time is very small to create strong squish flows so that the squish area cannot suck the vertical large swirl of the air-fuel mixture. Accordingly, when the vertical large swirls are sucked into the squish area, they become streamline flows.

Thereafter, flame reaches the vicinity of the squish area and the flame is sucked into the squish area due to piston movement. Thus, the air-fuel mixture in the squish area is burned. However, no turbulence of the air-fuel mixture is created in the squish area so that good combustion in the squish area cannot be realized.

SUMMARY OF THE INVENTION

Therefore, an object of the present invention is to provide a combustion chamber of an internal combustion engine, capable of creating strong turbulence in the center portion thereof due to the squish flows, which can improve the combustion in the squish area.

According to the present invention, there is provided a combustion chamber of an internal combustion engine comprising: an approximately triangular upper wall in at least one vertical section passing through the center of the combustion chamber; a squish area formed by a peripheral portion of upper wall of piston and the upper wall of said combustion chamber; and a step which is formed on at least one of the peripheral portions of the piston and the upper wall of the combustion chamber, the radial and outward flows impinging on the step inside of the squish area, a height of the step in at least the vicinity of the vertical section being approximately equal to the smallest clearance of the squish area.

The present invention will be more fully understood from the description of preferred embodiments of the invention as set forth below, together with the accompanying drawings.

DESCRIPTION OF THE PREFERRED EMBODIMENTS

Figure 1:
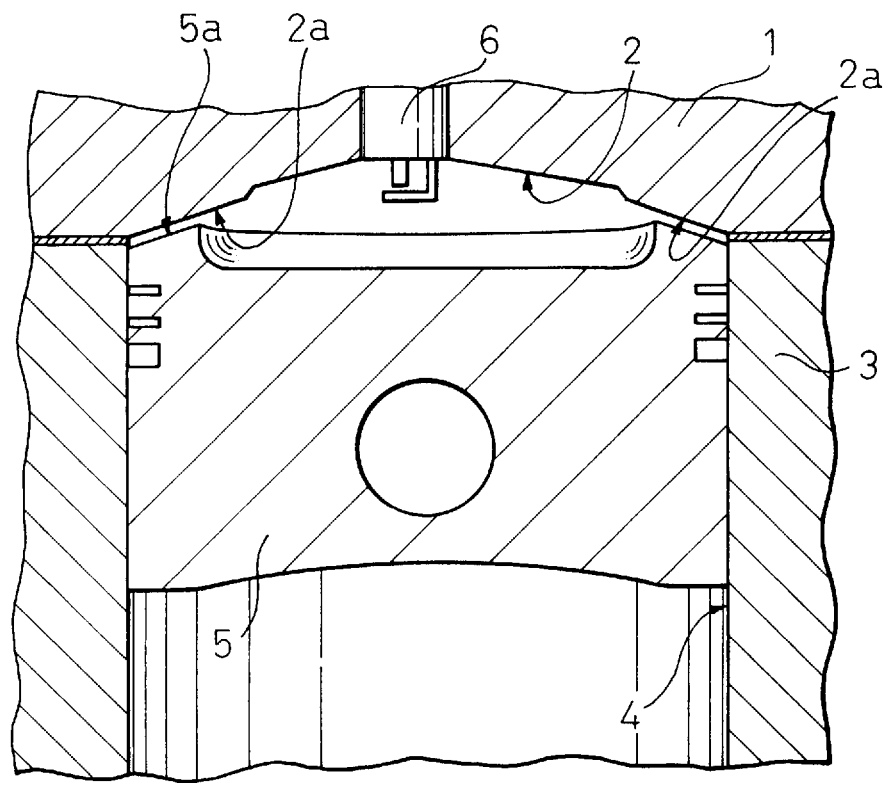
FIG. 1 is a schematic vertical sectional view of a combustion chamber of an internal combustion engine according to a first embodiment of the present invention.
Figure 2:
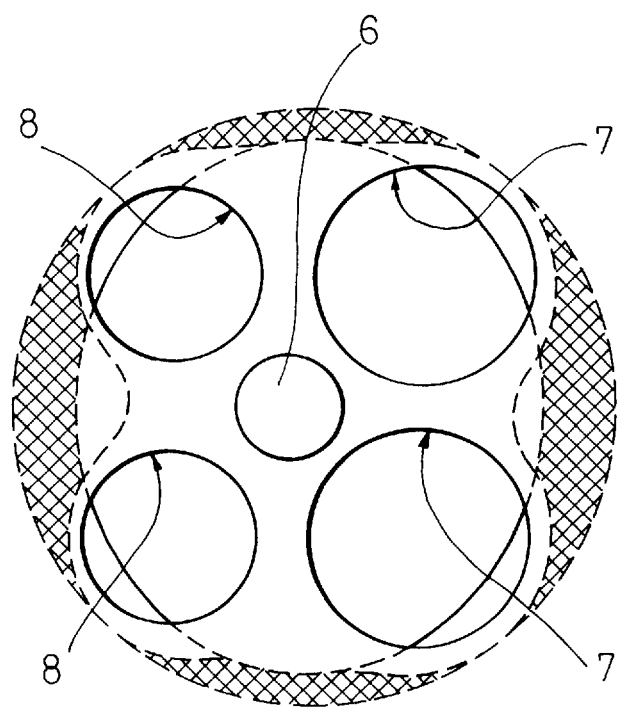
FIG. 2 is a plan view of FIG. 1.

FIG. 1 is a schematic vertical sectional view of a combustion chamber of an internal combustion engine according to the present invention. FIG. 2 is a plan view of FIG. 1. In these figures, reference numeral 1 designates a cylinder head in which the upper wall 2 of the combustion chamber is formed, reference numeral 3 designates a cylinder block in which the cylinder bore 4 is formed, and reference numeral 5 designates a piston reciprocating within the cylinder bore 4. The upper wall 2 is approximately conical. A spark plug 6 is arranged at the top portion of the upper wall 2 of the combustion chamber. To simplify, the intake and exhaust valves are omitted.

The peripheral portion of the upper wall 2 of the combustion chamber projects downward partly to avoid the openings 7, 8 for the intake and exhaust valves. On the other hand, the peripheral portion of the upper wall of the piston 5 is projected upward with a ring shape. The lower surface 2a of the peripheral portion of the upper wall 2 of the combustion chamber and the upper surface 5a of the peripheral portion of the upper wall of the piston 5 are formed approximately parallel with the conical upper wall 2 of the combustion chamber. The lower surface 2a and the upper surface 5a become close each other at the end of a compression stroke and form the squish area shown by cross lines in FIG. 2. Therefore, squish flows from the peripheral portion of the combustion chamber to the spark plug 6 are created. These squish flows impinge on each other at the vicinity of the spark plug 6 so that strong turbulence is produced, and thus a combustion speed at the center portion of the combustion chamber becomes high and a good combustion can be realized. In the present embodiment, these squish flows do not weaken since the peripheral portion of the upper wall of the combustion chamber is projected downward such that the squish flows do not contact with the upper wall 2 of the combustion chamber. Thus, the strong squish flows impinge each other and the turbulence at the vicinity of the spark plug 6 can be made very strong.

Figure 3:
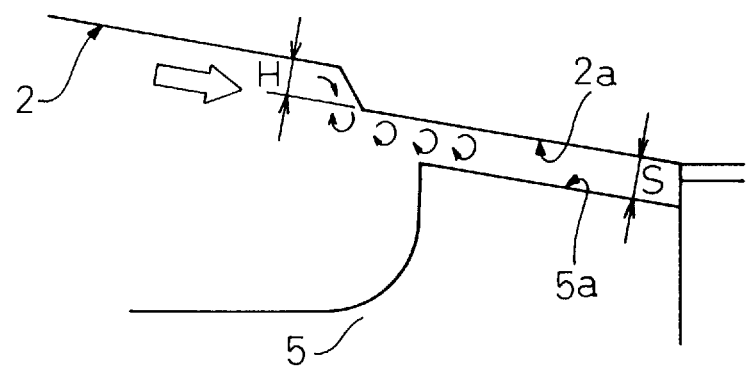
FIG. 3 is an enlarged vertical sectional view of the squish area of FIG. 1.

Immediately after the top dead center of a compression stroke, the air-fuel mixture is sucked into the squish area due to the piston lowering and thus the opposite squish is produced. At this time, the air-fuel mixture flows radially and outwardly along the upper wall 2 of the combustion chamber and impinges on the step formed by the peripheral portion of the upper wall 2 and thus vertical swirls of the air-fuel mixture are created. In the present embodiment, the step has a height (H) which is approximately equal to a smallest distance between the lower surface 2a of the peripheral portion of the upper wall 2 of the combustion chamber and the upper surface 5a of the peripheral portion of the upper wall of the piston 5 at the top dead center of a compression stroke, i.e., a smallest clearance (S) (1 to 2 mm) of the squish area. Therefore, as shown in FIG. 3 which is an enlarged vertical sectional view of the squish area, the vertical swirls created by the step having the height (H) have a small size which is approximately equal to the smallest clearance (S). Thus, these vertical swirls do not become streamline flows and are sucked into the squish area so that the strong turbulence can be created in the squish area.

Thereafter, flame reaches the vicinity of the squish area and the flame is sucked into the squish area due to the further piston lowering. Thus, the air-fuel mixture in the squish area is burned and a good combustion at a high combustion speed in the squish area can be realized due to the strong turbulence.

Figure 4:
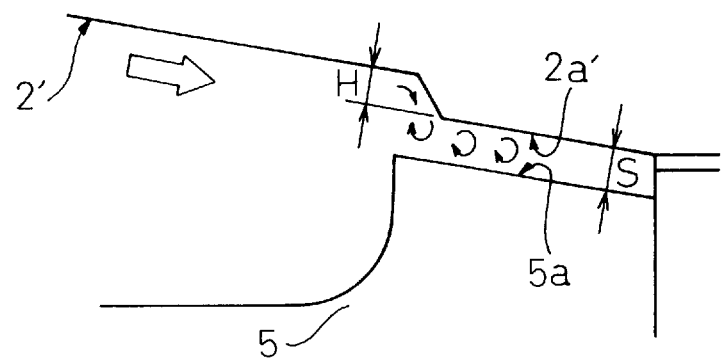
FIG. 4 is an enlarged vertical sectional view corresponding to FIG. 3, according to a second embodiment of the present invention.

FIG. 4 is an enlarged vertical sectional view of a second embodiment corresponding to FIG. 3. In the second embodiment, the step having the height (H) is formed on the upper wall 2' of the combustion chamber to face the upper surface 5a of the peripheral portion of the upper wall of the piston 5. In the second embodiment, the vertical swirls do not become streamline flows and are sucked into the squish area as in the first embodiment. Therefore, a good combustion can be realized by the strong turbulence.

Figure 5:
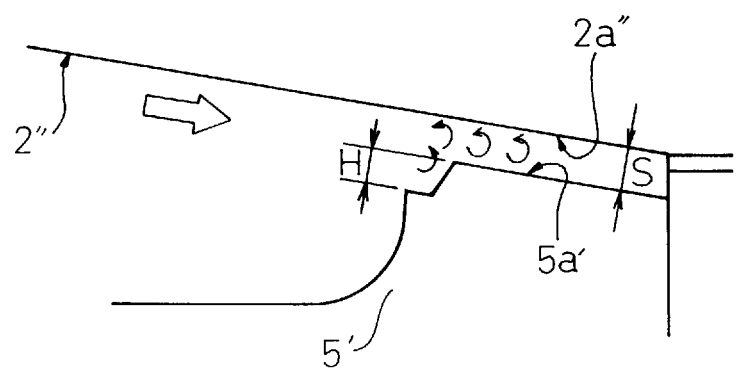
FIG. 5 is an enlarged vertical sectional view corresponding to FIG. 3, according to a third embodiment of the present invention.

FIG. 5 is an enlarged vertical sectional view of a third embodiment corresponding to FIG. 3. In the third embodiment, the step having the height (H) is formed on the upper surface 5a' of the peripheral portion of the upper wall of the piston 5'. On the other hand, no step is formed on the upper wall 2" of the combustion chamber. In the third embodiment, the squish area is formed between the lower surface 2a" of the peripheral portion of the upper wall 2" of the combustion chamber and the upper surface 5a' of the peripheral portion of the upper wall of the piston 5'. Immediately after the top dead center of a compression stroke, a opposite squish is produced as in the first embodiment. At this time, vertical swirls having a size which is approximately equal to the smallest clearance (S) of the squish area can be created inside of the squish area. Therefore, these vertical swirls do not become streamline flows and are sucked into the squish area and thus a good combustion can be realized by the strong turbulence.

Figure 6:
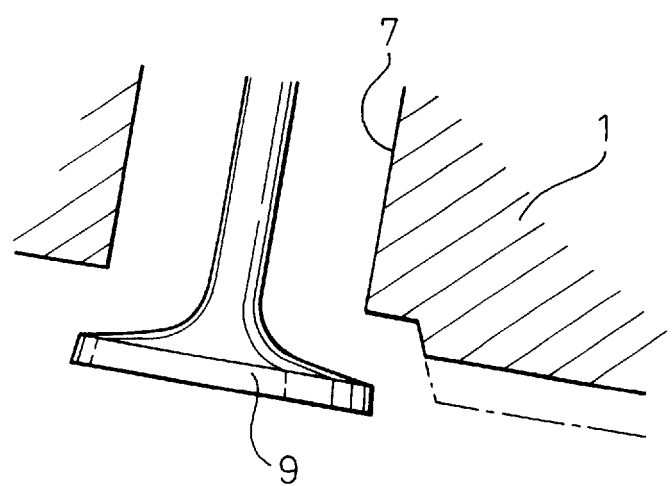
FIG. 6 is an enlarged vertical sectional view of the vicinity of the intake valve, according to the first embodiment of the present invention.

FIG. 6 is an enlarged vertical sectional view in the vicinity of the intake valve 9 of the first embodiment. The step formed on the upper wall 2 of the combustion chamber has a lower height than in the prior art (dot and dash line). Therefore, in an intake stroke, an opening area in the vicinity of the intake valve 9 becomes larger than in the prior art. Thus, an intake resistance in an intake stroke can be decreased so that a charging efficiency can be increased. In connection with the exhaust valve, an exhaust resistance in an exhaust stroke can be decreased by the lower height step.

In all the above-mentioned embodiments, the upper wall of the combustion chamber is approximately conical. However, this does not limit the present invention. For example, in case that a combustion chamber has a pent roof shape upper wall, in only the vicinity of a vertical section which passes through the center of the combustion chamber and has an approximately triangular shape formed by a surface in which an intake valve is arranged and a surface in which an exhaust valve is arranged, the height of the step may be regulated as shown in FIGS. 1, 3, 4, or 5.

Therefore, in at least the vicinity of the vertical section, when the opposite squish is produced, turbulence can be created in the squish area. Thus, a combustion speed becomes higher than in the prior art so that combustion can be improved. Moreover, in the prior art, a combustion speed in the squish area is generally slow so that knocking phenomenon can occur in the squish area. In such a pent roof shape type combustion chamber, the combustion speed can not be generally increased. However, the knocking phenomenon occurs in an area at which temperature is lowest and at which combustion is latest, i.e., an intake valve side of the squish area. A height of the step in this area of the squish area is regulated as above-mentioned so that turbulence can be created in this area and a combustion speed in this area becomes high, and thus the knocking phenomenon dose not occur.

Although the invention has been described with reference to specific embodiments thereof, it should be apparent that numerous modifications can be made thereto by those skilled in the art, without departing from the basic concept and scope of the invention.

We claim:

1. A combustion chamber of an internal combustion engine comprising:

an approximately triangular upper wall in at least one vertical section passing through the center of said combustion chamber;

a squish area formed by a peripheral portion of an upper wall of a piston and a peripheral portion of said upper wall of said combustion chamber; and a step which is formed on one of said peripheral portion of the upper wall of said piston and said eritpheral portion of the upper wall of said combustion chamber, whereby radial and outward flows impinge on said step inside of said squish area, a height of said step in at least the vicinity of said vertical section being approximately equal to the smallest clearance of said squish area.

2. A combustion chamber according to claim 1, wherein said peripheral portion of the upper wall of said piston projects upward.

3. A combustion chamber according to claim 1, wherein said step is formed on said peripheral portion of the upper wall of said combustion chamber.

4. A combustion chamber according to claim 3, wherein said step is formed to face to said peripheral portion of said piston of the upper wall.

5. A combustion chamber according to claim 3, wherein said squish area extends to be approximately parallel to said upper wall of said combustion chamber in at least the vicinity of said vertical section.

6. A combustion chamber according to claim 1, wherein said step is formed on said peripheral portion of the upper wall of said piston.

7. A combustion chamber according to claim 1, wherein said upper wall of said combustion chamber is approximately conical.

8. A combustion chamber according to claim 7, wherein said squish area extends to be approximately parallel to said upper wall of said combustion chamber.

\* \* \* \* \*

UNITED STATES PATENT AND TRADEMARK OFFICE
CERTIFICATE OF CORRECTION

PATENT NO.   : 5,771,872
DATED        : June 30, 1998
INVENTOR(S)  : Takanori UEDA and Takeshi OKUMURA It is certified that error appears in the above-identified patent and that said Letters Patent is hereby corrected as shown below:

Claim 1, line 10, change "eritpheral" to --peripheral--.

Claim 4, lines 2 and 3, change "said piston of the upper wall" to

--the upper wall of said piston--.

Signed and Sealed this

First Day of December, 1998

*Attest:*

BRUCE LEHMAN

*Attesting Officer*   Commissioner of Patents and Trademarks